United States Patent
Hosogaya

(10) Patent No.: US 9,916,103 B2
(45) Date of Patent: Mar. 13, 2018

(54) MEMORY CONTROL DEVICE, MEMORY DEVICE, AND MEMORY CONTROL METHOD

(71) Applicant: SONY CORPORATION, Tokyo (JP)

(72) Inventor: Yuto Hosogaya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/306,903

(22) PCT Filed: Apr. 21, 2015

(86) PCT No.: PCT/JP2015/002168
§ 371 (c)(1),
(2) Date: Oct. 26, 2016

(87) PCT Pub. No.: WO2015/170454
PCT Pub. Date: Nov. 12, 2015

(65) Prior Publication Data
US 2017/0046084 A1    Feb. 16, 2017

(30) Foreign Application Priority Data

May 7, 2014 (JP) ................................. 2014-095925

(51) Int. Cl.
*G11C 7/10*     (2006.01)
*G06F 3/06*     (2006.01)
*G06F 12/16*    (2006.01)

(52) U.S. Cl.
CPC ............ *G06F 3/0619* (2013.01); *G06F 3/065* (2013.01); *G06F 3/0655* (2013.01); *G06F 3/0688* (2013.01); *G06F 12/16* (2013.01)

(58) Field of Classification Search
CPC ....... G06F 3/0619; G06F 3/065; G06F 3/0655
USPC ....................................... 365/189.011–225.7
See application file for complete search history.

(56) References Cited

U.S. PATENT DOCUMENTS

| | | | |
|---|---|---|---|
| 2005/0108472 A1* | 5/2005 | Kanai | .................. G06F 3/0605 |
| | | | 711/112 |
| 2006/0031650 A1* | 2/2006 | Kanai | .................. G06F 3/0605 |
| | | | 711/162 |
| 2007/0198798 A1* | 8/2007 | Kanai | .................. G06F 3/0605 |
| | | | 711/165 |

FOREIGN PATENT DOCUMENTS

| | | |
|---|---|---|
| JP | 2006-126919 A | 5/2006 |
| JP | 2008-299848 A | 12/2008 |
| JP | 4956922 B | 6/2012 |
| JP | 4956922 B2 | 6/2012 |

* cited by examiner

*Primary Examiner* — Harry W Byrne
(74) *Attorney, Agent, or Firm* — Chip Law Group

(57) ABSTRACT

A memory control device includes a control unit that performs data write/read control on a nonvolatile memory having at least a first area and a second area. In a case where writing sets of data into the first area, the control unit temporarily writes the sets of data into the second area. In a case where copying the respective sets of data written into the second area into the first area, the control unit sets a flag indicating whether the copying of the sets of data into the first area has been completed.

7 Claims, 9 Drawing Sheets

A

B

C

MEMORY CONTROL DEVICE, MEMORY DEVICE, AND MEMORY CONTROL METHOD

CROSS REFERENCE TO RELATED APPLICATIONS

This application is a U.S. National Phase of International Patent Application No. PCT/JP2015/002168 filed on Apr. 21, 2015, which claims priority benefit of Japanese Patent Application No. JP 2014-095925 filed in the Japan Patent Office on May 7, 2014. Each of the above-referenced applications is hereby incorporated herein by reference in its entirety.

TECHNICAL FIELD

The present disclosure relates to a memory control device, a memory device, and a memory control method.

BACKGROUND ART

Studies on nonvolatile memories (nonvolatile random access memories (NVRAM)) that can be randomly accessed and can be rewritten with data are being actively made. Suggested examples of nonvolatile memories include magnetic random access memories (MRAMs) including spin transistor torque (STT)-RAMs, phase change memories (PCMs), and resistive random access memories (ReRAMs). Some of these memories are disclosed in Patent Document 1 shown below. MRAMs, PCMs, ReRAMs, and the like can achieve high degrees of integration, and have high rewrite speeds. In view of this, MRAMs, PCMs, ReRAMs, and the like are expected to be used as main storages to replace static random access memories (SRAMs) and dynamic random access memories (DRAMs).

CITATION LIST

Patent Document

Patent Document 1: JP 4956922 B2

SUMMARY OF THE INVENTION

Problems to be Solved by the Invention

Meanwhile, where a nonvolatile memory is used, power cutoff not intended by the user sometimes occurs due to an electric power failure or an incorrect operation. Even in a case where unintended power cutoff has occurred, information (data) consistency is preferably maintained in the nonvolatile memory before and after the power cutoff.

One object of the present disclosure is to provide a memory control device, a memory device, and a memory control method that can maintain data consistency in a nonvolatile memory before and after power cutoff, even in a case where unintended power cutoff has occurred, for example.

Solutions to Problems

To solve the above problems, the present disclosure relates to, for example, a memory control device that includes a control unit that performs data write/read control on a nonvolatile memory having at least a first area and a second area, wherein:

when writing sets of data into the first area, the control unit temporarily writes the sets of data into the second area; and, when copying the respective sets of data written into the second area into the first area, the control unit sets a flag indicating whether the copying of the sets of data into the first area has been completed.

The present disclosure relates to, for example, a memory control device that includes a control unit that performs data write/read control on a nonvolatile memory having at least a first area and a second area, wherein, when a first flag has been set at a time of activation of a power supply, the control unit copies data having a second flag set therefor into the first area, the data being of data stored in the second area.

The present disclosure relates to, for example, a memory device that includes:

a nonvolatile memory having at least a first area and a second area; and a control unit that performs data write/read control on the nonvolatile memory, wherein:

when writing sets of data into the first area, the control unit temporarily writes the sets of data into the second area, and, when copying the respective sets of data written into the second area into the first area, the control unit sets a flag indicating whether the copying of the sets of data into the first area has been completed.

The present disclosure relates to, for example, a memory device that includes:

a nonvolatile memory having at least a first area and a second area; and a control unit that performs data write/read control on the nonvolatile memory, wherein, when a first flag has been set at a time of activation of a power supply, the control unit copies data having a second flag set therefor into the first area, the data being of data stored in the second area.

The present disclosure relates to, for example, a memory control method implemented by a control unit that performs data write/read control on a nonvolatile memory having at least a first area and a second area, the memory control method including:

temporarily writing sets of data into the second area, when writing the sets of data into the first area; and, setting a flag indicating whether copying of the sets of data into the first area has been completed, when copying the respective sets of data written into the second area into the first area.

The present disclosure relates to, for example, a memory control method implemented by a control unit that performs data write/read control on a nonvolatile memory having at least a first area and a second area, the memory control method including, when a first flag has been set at a time of activation of a power supply, copying data having a second flag set therefor into the first area, the data being of data stored in the second area.

Effects of the Invention

According to at least one embodiment, data consistency in a nonvolatile memory can be maintained before and after power cutoff, even in a case where unintended power cutoff has occurred. It should be noted that the effects of the present technology are not limited to the effects described herein, and may include any of the effects described in the present disclosure. Also, the contents of the present disclosure should not be interpreted in a restrictive manner on the basis of the effects described as example effects herein.

MODES FOR CARRYING OUT THE INVENTION

Figure 1:
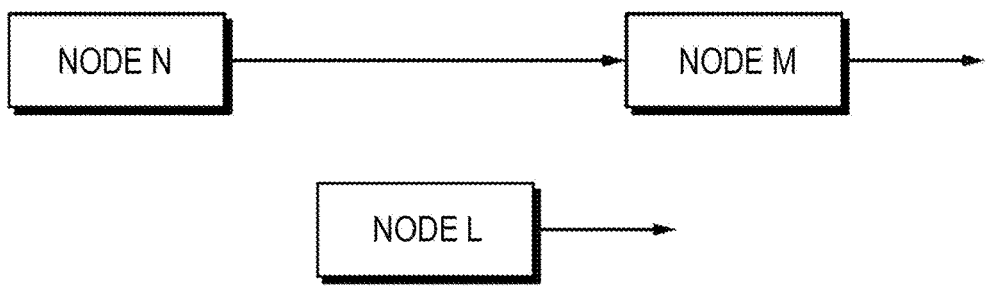
FIGS. 1A, 1B, and 1C are diagrams for explaining an example where data consistency is not maintained.
Figure 1:
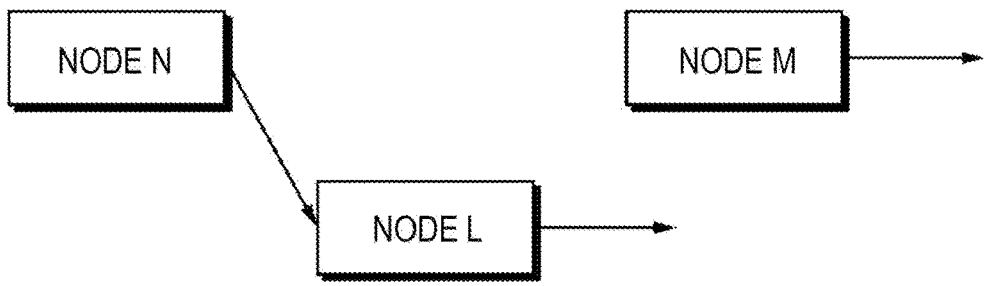
Figure 1:
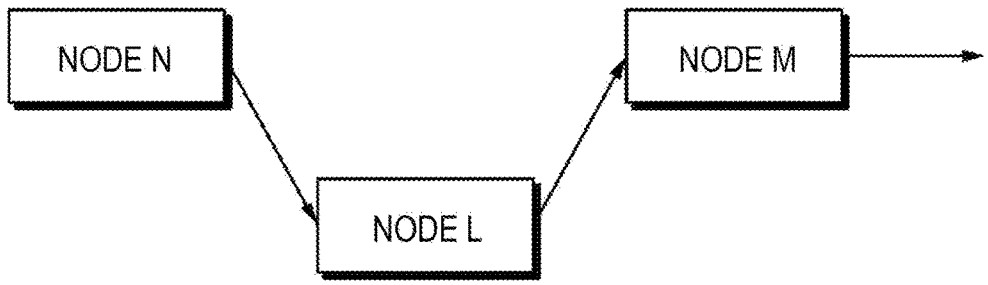

The following is a description of an embodiment of the present disclosure, with reference to the drawings. It should be noted that explanation will be made in the following order.

<1. Embodiment>
<2. Modification>

The embodiment and the like described below are preferred specific examples of the present disclosure, and the contents of the present disclosure are not limited to the embodiment and the like.

1. Embodiment

In an information processing system, a DRAM or the like is used as the main storage (work memory) of the central processing unit (CPU) (also referred to as the processor or the like in some cases). This DRAM is normally a volatile memory, and the data stored in the DRAM disappears when the power supply is stopped.

Meanwhile, nonvolatile memories are also used as main storages these days. Nonvolatile memories are roughly classified into flash memories compatible with large-size data access, and nonvolatile random access memories capable of high-speed random access to small-size data. Examples of flash memories include NAND flash memories. Meanwhile, examples of nonvolatile random access memories include the above described MRAMs, PCM, and ReRAMs.

In an embodiment of the present disclosure, a nonvolatile memory is used as the main storage. Not to mention the above described example kinds of nonvolatile memories, some other nonvolatile memory can be used in the embodiment of the present disclosure. Where a nonvolatile memory is used as the main storage, the information stored before the power supply is cut off remains in the nonvolatile memory, and accordingly, there is no need to reconstruct or reload the information after the power supply is reactivated. Thus, the activation process can be performed at a higher speed, and the suspended application can be resumed from the state in which the application was before the cutoff of the power supply.

However, if the power supply is unintentionally cut off during a process being performed on a nonvolatile memory, such as a rewrite process, the state of the memory cells of the nonvolatile memory becomes unstable, resulting in data destruction. A capacitor or a battery is provided in the system so as to supply enough power to appropriately end the rewrite process on the nonvolatile memory even if the power supply is unintentionally cut off. Thus, data destruction can be prevented. However, it is difficult to provide a capacitor or a battery particularly in a small-sized memory device, due to physical restrictions.

Meanwhile, the number of bits in a memory that can be rewritten with a single write request from the CPU is limited by the memory specification, for example. Therefore, even though the data to be rewritten with a single rewrite request is protected from unintended power cutoff, the data structure of the nonvolatile memory becomes inconsistent when the power supply is cut off during a process that becomes valid with more than one rewrite request. As a result, inconvenience might be caused, such as an incorrect operation of the system after the power supply is reactivated.

Referring to FIGS. 1A through 1C, this problem is described in detail. FIGS. 1A, 1B, and 1C schematically show a list structure (a unidirectional list) that is an example of a data structure. In the list structure, an information portion including a data portion and a pointer portion is called a node. The data portion is actual data, and the pointer portion indicates the next data.

As shown in FIG. 1A, in an initial state, a node N and a node M are associated with each other (step ST0). Here, a process of adding a node L between the node N and the node M is discussed. In this case, a rewrite process is performed so that the pointer of the node N indicates the address of the node L, as shown in FIG. 1B (step ST1). Next, a rewrite process is performed so that the pointer of the node L indicates the address of the node M, as shown in FIG. 1C (step ST2). In this manner, a rewrite process is performed twice to add a node to the data structure of a unidirectional list, for example. These two rewrite processes are equivalent to one process in a program that becomes valid only when each of the processes ends properly.

Specifically, during the processes, the power supply is unintentionally cut off between the process in step ST1 and the process in step ST2, for example. In this case, the state at the time of reintroduction of the power supply is the state shown in FIG. 1B. That is, the node L and the node M are not associated with each other, and the link structure that is the data structure of the list structure becomes improper.

As described above, when the power supply is unintentionally cut off during processes (write processes, for example), data consistency might not be maintained. In the description below, an embodiment of the present disclosure that has been developed in view of the above problem will be described. It should be noted that although FIGS. 1A through 1C show an example of a unidirectional list for ease of understanding, the data structures that can be used in the embodiment of the present disclosure are not limited to that.

It should be noted that in the description below, a series of rewrites that become valid when the memory is rewritten more than once, for example, will be referred to as a "transaction". Also, reflecting a rewrite during a transaction in the memory will be referred to as a "commit". In the example shown in FIGS. 1A through 1C, the series of rewrite processes performed through the processes in steps ST1 and ST2 started from the state in step ST0 are equivalent to a transaction process. When the results of the processes in steps ST1 and ST2 are reflected in the memory and are confirmed, a commit is performed. Unintended power cutoff might occur during a transaction process or a commit.

[Example Configuration of a Memory Device]

Figure 2:
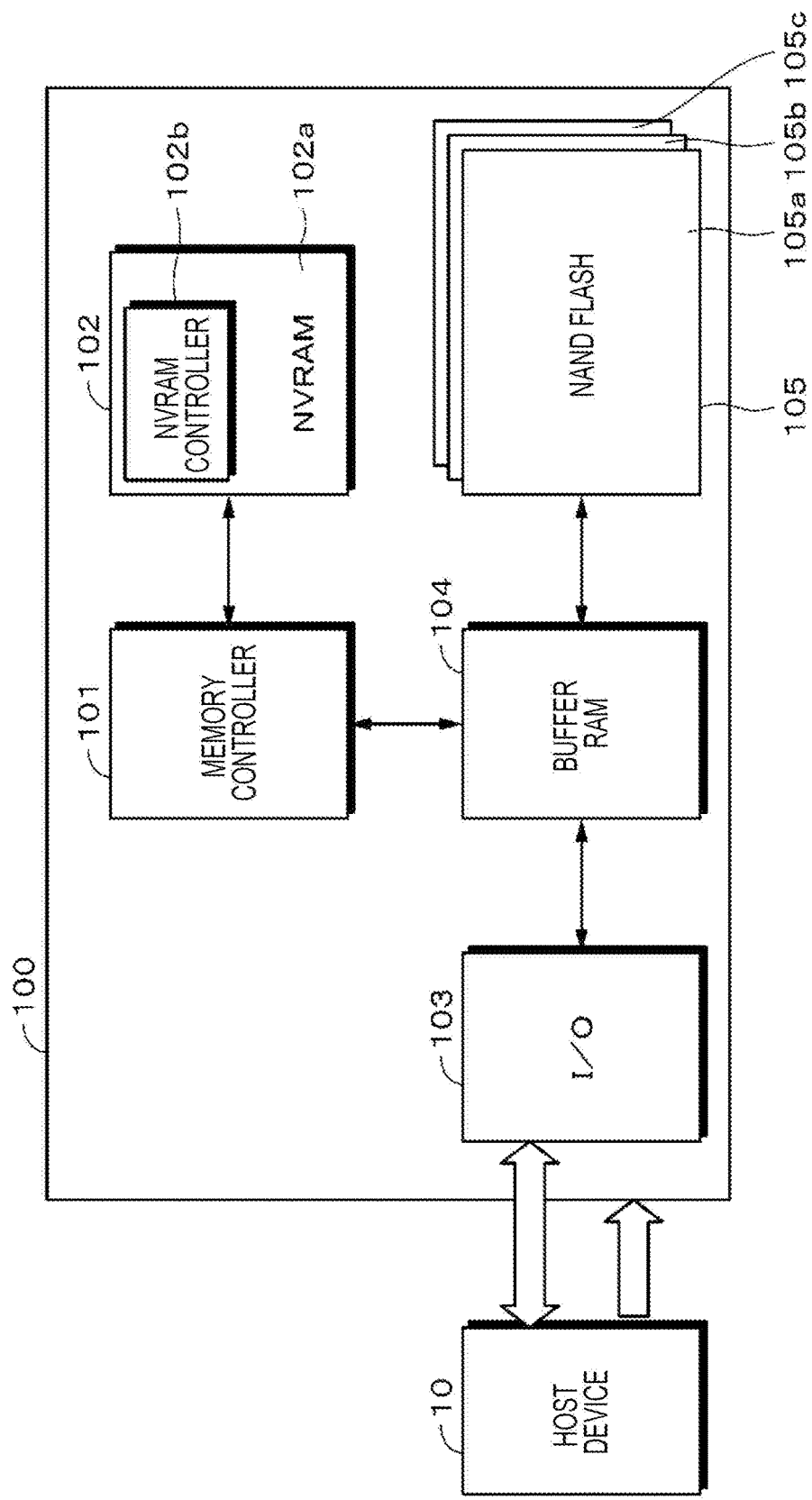
FIG. 2 is a block diagram for explaining an example configuration of a memory device according to an embodiment of the present disclosure.

FIG. 2 shows an example of an information processing system 1 including a memory device according to an embodiment of the present disclosure. The information processing system 1 includes a host device 10 and a memory device 100, for example. The host device 10 is a personal computer, an imaging device, a portable electronic device such as a portable telephone or a smartphone, or the like. The memory device 100 is a so-called memory card of a portable type, for example. The memory device 100 can be detachably attached to the host device 10, for example.

Data and commands are exchanged between the host device 10 and the memory device 100. Also, power is supplied from the host device 10 to the memory device 100 while the memory device 100 is connected to the host device 10. The memory device 100 operates, with its power being supplied from the host device 10. Therefore, when the memory device 100 is detached from the host device 10, or the power supply from the host device 10 stops, the operation of the memory device 100 stops. It should be noted that the host device 10 and the memory device 100 can be mechanically attached to and detached from each other, but the present technology is not limited to that. The host device 10 and the memory device 100 may be connected (pairing) by a predetermined wireless scheme so that data, electrical power, and the like can be wirelessly exchanged. The memory device 100 may also include an energy storage element, such as a capacitor or a battery.

The memory device 100 includes a memory controller 101, a main storage 102, an external interface (input output (I/O)) 103, a buffer RAM 104, and a nonvolatile memory denoted by reference numeral 105, for example. The memory controller 101 is connected to both the main storage 102 and the buffer RAM 104. The buffer RAM 104 is connected to both the external interface 103 and the nonvolatile memory.

The memory controller 101 performs control on the respective components of the memory device 100. Specifically, the memory controller 101 interprets a command received by the external interface 103 from the external host device 10, performs data write/read control on the nonvolatile memory in accordance with a command, and generates various kinds of management information for managing the data recorded in the nonvolatile memory, for example. The memory controller 101 further performs an ECC error correction process or the like in generating, adding, or reading error correction code (ECC) data when data is written into the nonvolatile memory. The memory controller 101 also performs information processing by executing various kinds of programs. Using a storage area in the main storage 102 as the work area, the memory controller 101 executes a program by repeatedly loading or storing data.

The main storage 102 functions as the main storage for the memory controller 101. The main storage 102 is a nonvolatile memory (NVRAM), and may be one of the above described various kinds of nonvolatile memories. The main storage 102 includes an NVRAM 102a that is an area in which data and the like are stored, and an NVRAM controller 102b that can access the NVRAM 102a and communicate with the memory controller 101.

The external interface 103 is provided to enable transmission and reception of various kinds of data between the external host device 10 and the memory controller 101. A command that is input from the host device 10 is received via the external interface 103, and data is transmitted to and received from the host device 10 via the external interface 103.

The buffer RAM 104 is formed with an SRAM that is a volatile memory, for example, and temporarily stores data to be read from or written into the nonvolatile memory. It should be noted that although the memory device 100 includes the buffer RAM 104 in the configuration shown in FIG. 2, an external memory device attached to the memory device 100 may be used as the buffer memory.

The nonvolatile memory is formed with NAND flash memories, for example. A NAND flash memory includes a memory cell array in which electrically rewritable memory cells are arranged in a matrix fashion. It should be noted that although three nonvolatile memories are provided in the example shown in FIG. 2, the present technology is not limited to that. In the description below, the respective nonvolatile memories will be referred to as a flash memory 105a, a flash memory 105b, and a flash memory 105c. Where there is no need to distinguish the respective flash memories from one another, these flash memories will be referred to as the flash memories 105.

It should be noted that although not shown in the drawing, the respective flash memories 105 are connected to the memory controller 101 by signal lines. Each signal line is the signal line for supplying an enable signal to be used in indicating the data read/write timing to the current flash memory 105 to be read or written.

Also, a common data line is connected to the flash memories 105. This data line is also connected to the buffer RAM 104 so that write data can be supplied from the buffer RAM 104 to the flash memories 105, and read data can be supplied from the flash memories 105 to the buffer RAM 104.

It should be noted that the configurations of the information processing system 1 and the memory device 100 shown in FIG. 2 are examples, and the present technology is not limited to them. For example, the memory device 100 is not necessarily a memory card, and the present disclosure can be applied to any device that includes a main storage connected to a CPU. Also, the above described wiring lines in the memory device 100 are the ones according to the embodiment. In practice, other wiring lines, such as signal lines for designating read/write addresses, are also provided, but such wiring lines are not shown in the drawing.

An example of a write operation and an example of a read operation in the information processing system 1 are now roughly described. Data designated to be written by the host device 10 is temporarily stored into the buffer RAM 104 via the external interface 103. Under the control of the memory controller 101, the data stored in the buffer RAM 104 is written into a predetermined one of the flash memories 105 via the data line.

In a case where data written in one of the flash memories 105 is designated to be read by the host device 10, predetermined data is read from the flash memory 105 under the control of the memory controller 101. After temporarily stored into the buffer RAM 104 via the data line, the read data is sent to the host device 10 via the external interface 103 at a predetermined time.

[Example of the Logical Configuration of the NVRAM]

Figure 3:
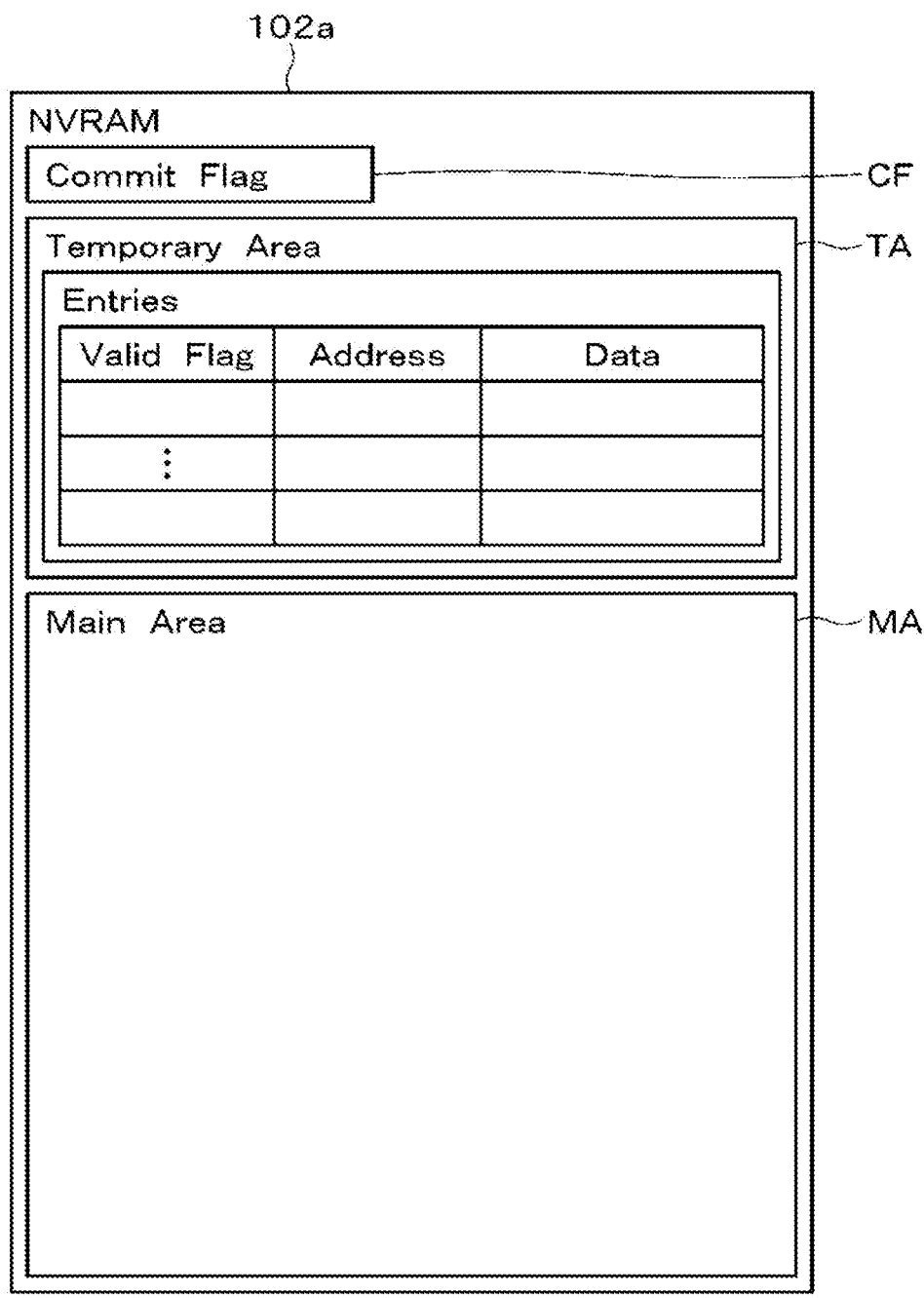
FIG. 3 is a diagram for explaining an example of the logical configuration of a main storage (a nonvolatile memory) according to the embodiment of the present disclosure.

FIG. 3 shows an example of the logical configuration of the NVRAM 102a. In the memory space of the NVRAM 102a, a commit flag area CF, a temporary area (temporary storage area) TA, and a main area (main storage area) MA are set, for example. As the commit flag area CF, part of the temporary area TA may be assigned, or part of the main area MA may be assigned. The main area MA is equivalent to an example of the first area, and the temporary area TA is equivalent to an example of the second area.

A commit flag represented by at least one bit is stored in the commit flag area CF. The temporary area TA has a table structure that can store entries, for example. In each entry, a valid flag indicating whether the entry is valid, an address indicating the write destination in the main area MA, and data main body are stored and associated with one another. The valid flag is represented by one bit, for example.

[Example Process in the Memory Device]

Figure 4:
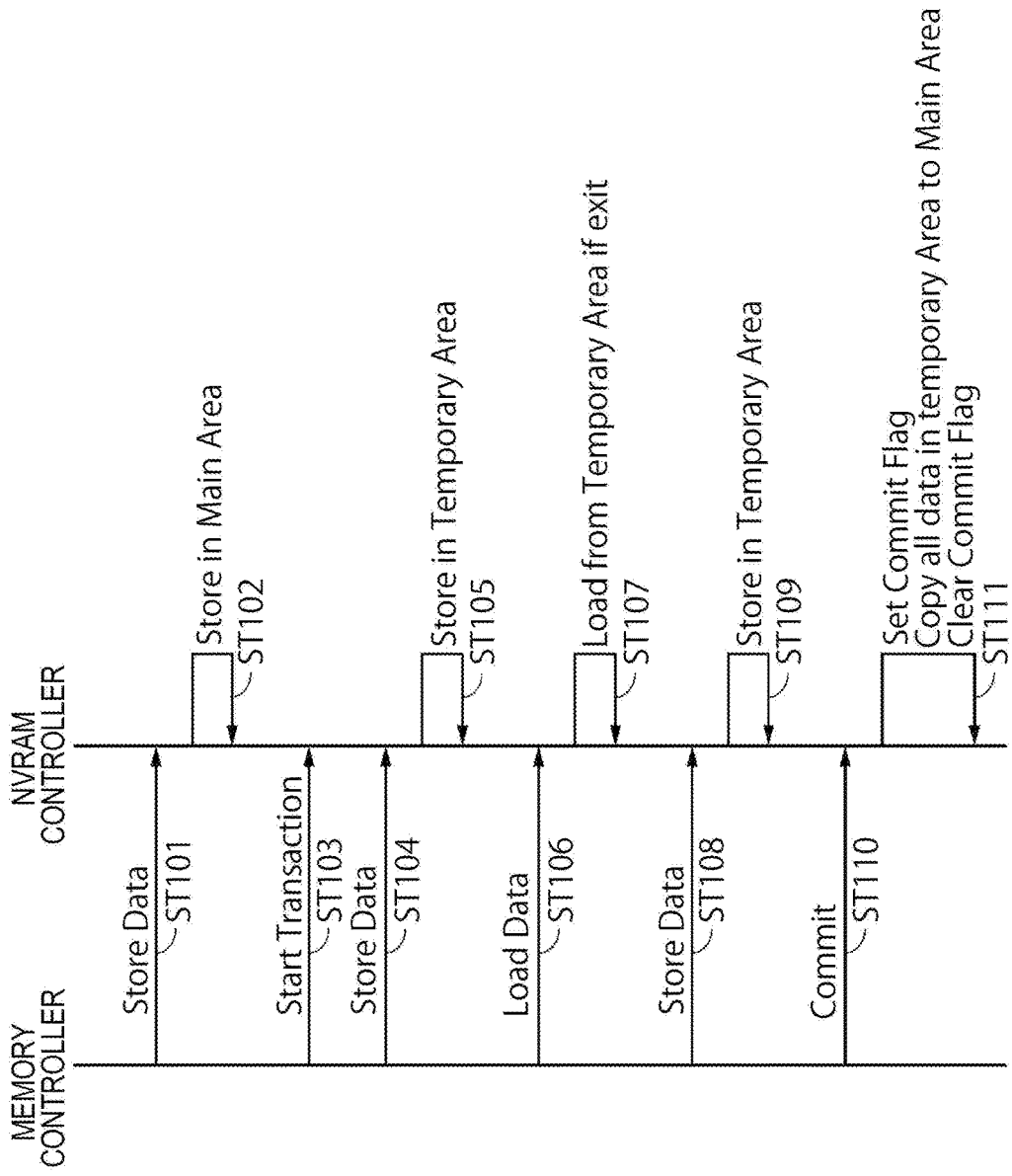
FIG. 4 is a sequence chart for explaining an example of a process sequence according to the embodiment of the present disclosure.

Referring to the sequence chart shown in FIG. 4, an example process in the memory device is described. The sequence chart shown in FIG. 4 is a sequence to be executed between the memory controller 101 and the NVRAM controller 102b. It should be noted that the example described below is an example where the memory controller 101 can directly access only the main area MA. That is, the addresses to which the memory controller 101 can refer are assigned only to the main area MA. The temporary area TA and the commit flag area CF are hidden in the NVRAM 102a, and the memory controller 101 cannot directly operate those areas in this example.

In a normal rewrite process, a rewrite request (Store Data) command is transmitted from the memory controller 101 to the NVRAM controller 102b (step ST101). In accordance with the rewrite request command, the NVRAM controller 102b rewrites the data stored at the designated address with specified data (step ST102).

In a case where a transaction process is to be performed, the memory controller 101 transmits a transaction start request (Start Transaction) command to the NVRAM controller 102b. The transaction start request command is received by the NVRAM controller 102b (step ST103).

A rewrite request command is transmitted to the NVRAM controller 102b (step ST104). The NVRAM controller 102b, which has received the transaction start request command, temporarily stores data, together with address information, into an entry in the table in the temporary area TA, and sets the valid flag as the process in response to the rewrite request command (step ST105). For example, the valid flag is set to "1". It should be noted that "1" and "0" in the description below indicate logical values.

It should be noted that in a case where a read request (Load Data) command is issued from the memory controller 101, data in the temporary area TA is read if the data corresponding to the read request command is stored in the temporary area TA (step ST106 and step ST107). It should be noted that if the data to be read is stored in the main area MA, however, the NVRAM controller 102b reads the corresponding data from the main area MA.

A rewrite request command is again issued to the NVRAM controller 102b (step ST108). The NVRAM controller 102b adds data, together with address information, to the entry in the table in the temporary area TA, and sets the valid flag (step ST109). For example, the valid flag is set to "1".

When the transaction process that is a series of rewrite processes ends, the memory controller 101 transmits a commit request (Commit) command to the NVRAM controller 102b (step ST110). The NVRAM controller 102b, which has received the commit request command, sets a commit flag. As the commit flag, "1" is set, for example.

The NVRAM controller 102b then copies the data from the table in the temporary area TA into the main area MA in accordance with the address information. For example, the data in the respective entries is copied into the main area MA, with each entry or entries stored in the temporary area TA being a unit. The NVRAM controller 102b clears the valid flags of the entries from which data has been copied. For example, the valid flag of each entry from which data has been copied is changed from "1" to "0".

After the data of all the entries is copied into the main area MA, the NVRAM controller 102b clears the commit flag (step ST111). For example, the commit flag is changed from "1" to "0". That is, the commit flag is the flag indicating whether the sets of data having valid flags have been copied into the main area MA. The process then comes to an end.

Figure 5:
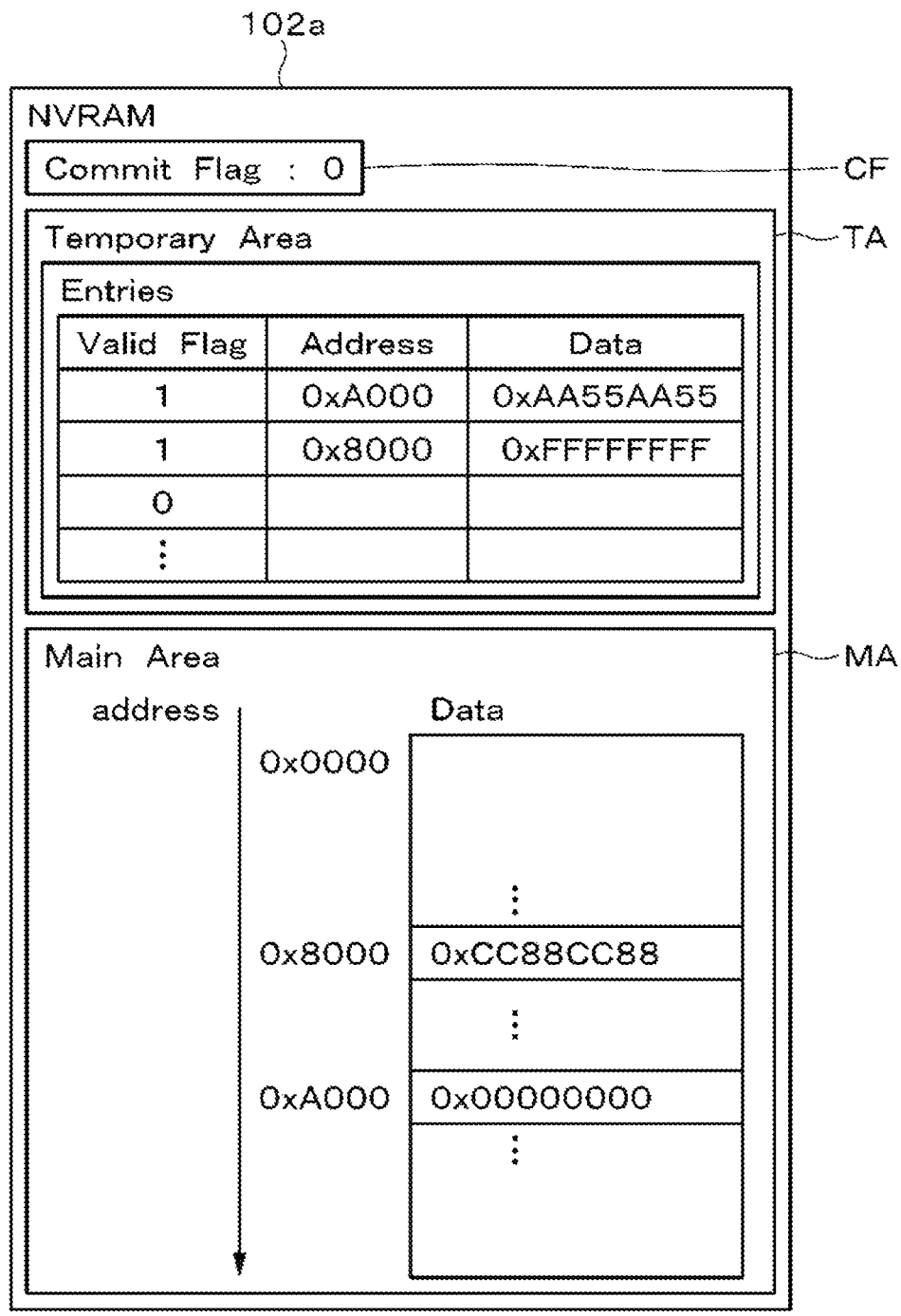
FIG. 5 is a diagram for explaining an example of the logical configuration of the main storage (nonvolatile memory) before a commit process is performed.

FIG. 5 shows an example of the logical configuration of the NVRAM 102a prior to a commit. As shown in FIG. 5, prior to a commit, the commit flag in the NVRAM 102a is set to "0", for example. It should be noted that the addresses and the data shown in FIGS. 5 and 6 are hexadecimally expressed.

Figure 6:
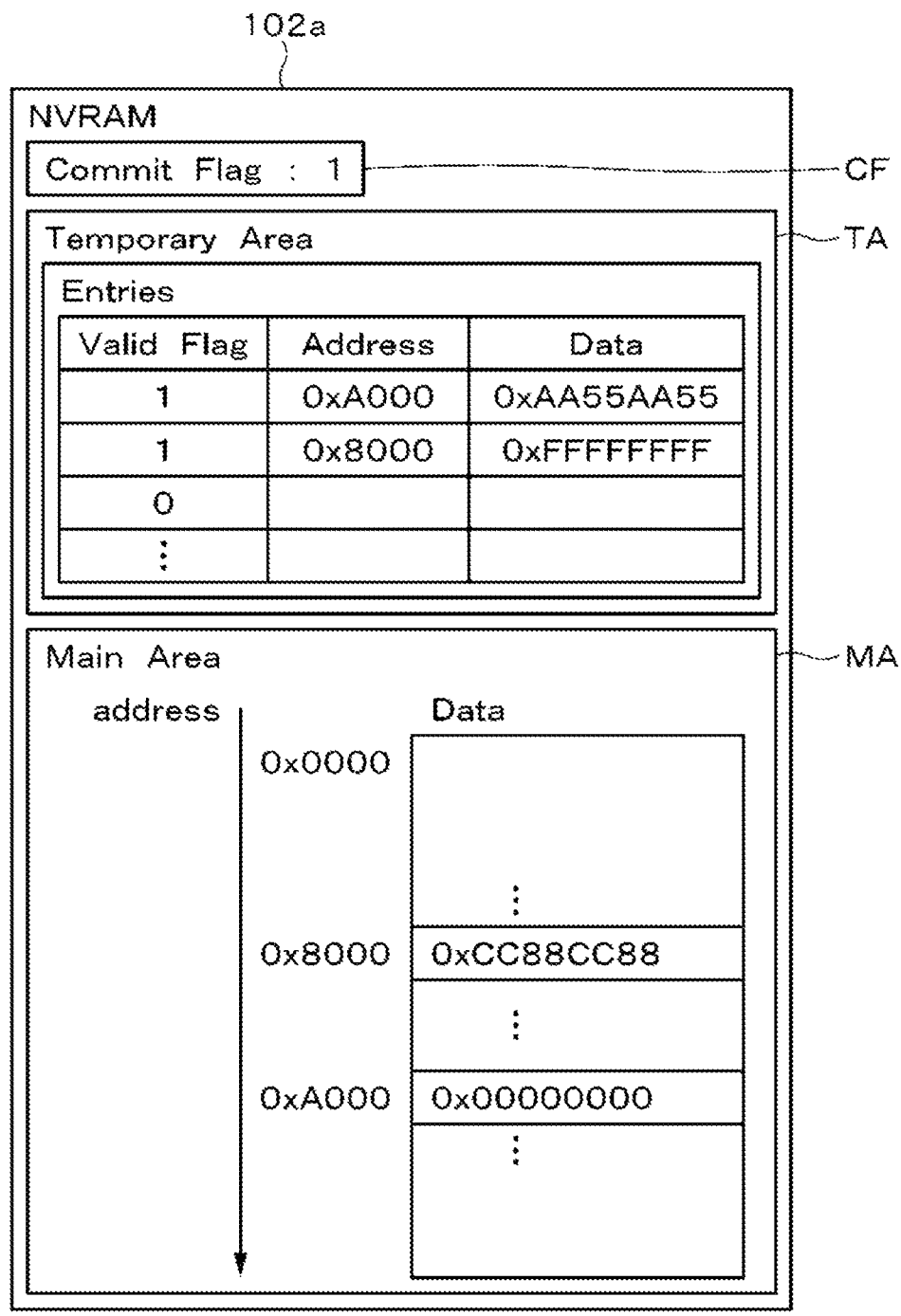
FIG. 6 is a diagram for explaining an example of the logical configuration of the main storage (nonvolatile memory) during a commit process.

Referring now to FIG. 6, a specific example of a commit process to be performed in response to a commit request command is described. As shown in FIG. 6, in response to a commit request command, the commit flag is set to "1", for example. The commit flag "1" indicates that a commit is being performed.

Data "0x00000000" is stored at an address "0xA000" in the main area MA. Also, data "0xCC88CC88" is stored at an address "0x8000". In the temporary area TA, data "0xAA55AA55" having the address "0xA000" as the write destination (copy destination) address, and data "0xFFFFFFFF" having the address "0x8000" as the write destination address are stored.

The data "0xAA55AA55" and the data "0xFFFFFFFF" each has "1" set as the valid flag. The data "0xFFFFFFFF" and the data "0xAA55AA55" are an example of the data corresponding to the respective write processes in a process to be made valid by the write processes.

As described above, in a commit process, data in the temporary area TA is copied into the area at a predetermined address in the main area MA. For example, the data "0xAA55AA55" is copied into the area at the address "0xA000" in the main area MA. That is, the data "0x00000000" is rewritten with the data "0xAA55AA55". After the rewrite process ends, the valid flag is changed from "1" to "0".

Likewise, the data "0xFFFFFFFF" is copied into the area at the address "0x8000" in the main area MA. That is, the data "0xCC88CC88" is rewritten with the data "0xFFFFFFFF". After the rewrite process ends, the valid flag is cleared, and is changed from "1" to "0". After the rewrite processes for all the data having "1" as valid flags are completed, the commit flag is cleared, and is changed from "1" to "0".

[Example of the Process After Reactivation of the Power Supply]

Figure 7:
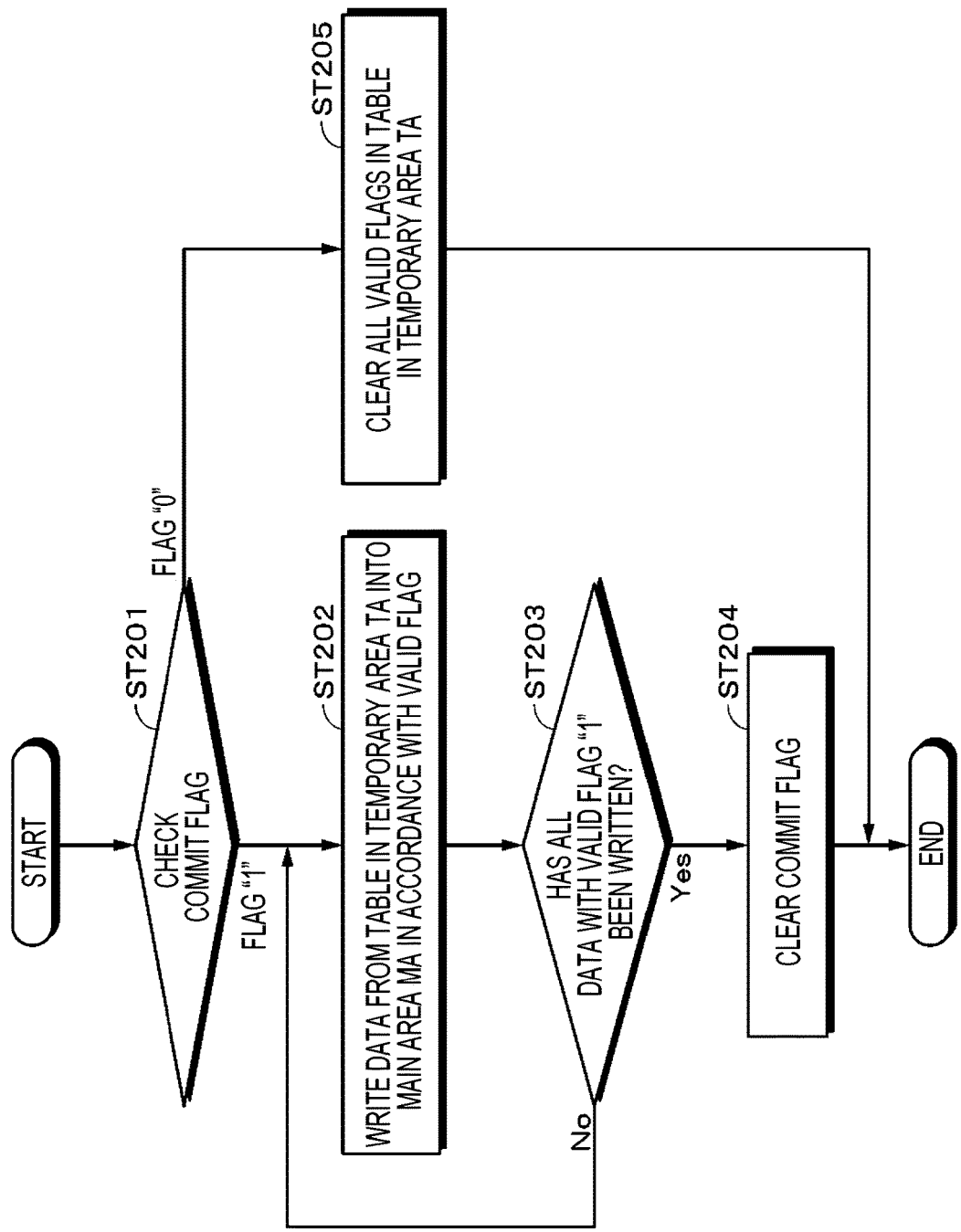
FIG. 7 is a flowchart for explaining an example of a process sequence after the power supply is reactivated according to the embodiment of the present disclosure.

FIG. 7 is a flowchart showing an example of the process sequence to be executed when the power supply is reactivated after unintended power cutoff occurs. The process described below is performed under the control of the NVRAM controller 102b, for example. The NVRAM controller 102b is designed to be able to determine whether the power supply is activated after a proper termination process is performed, or whether the power supply is activated after unintended power cutoff occurs, by referring to a command from the host device 10 or the data stored in the NVRAM controller 102b.

In step ST201, the NVRAM controller 102b checks the commit flag (equivalent to an example of the first flag) of the NVRAM 102a. In a case where the commit flag has been set, or where the commit flag is "1", the process moves on to step ST202.

In a case where the commit flag is "1", the commit process has not been completed due to a failure such as unintended power cutoff. That is, copying of data from the temporary area TA into the main area MA has not been completed in this state. Therefore, in step ST202, data in the table in the temporary area TA is written into the main area MA in accordance with the valid flag (equivalent to an example of the second flag). Specifically, the data in the entries having the valid flag "1" is written into the main area MA in accordance with the associated address information. It should be noted that the valid flags of the data written into the main area MA are changed from "1" to "0". The process then moves on to step ST203.

In step ST203, a check is made to determine whether all the data having the valid flag "1" in the temporary area TA has been written into the main area MA. In a case where not all the data having the valid flag "1" has been written into the main area MA, the process returns to step ST202, and the procedure in step ST202 is repeated. In a case where all the data having the valid flag "1" has been written into the main area MA, the process moves on to step ST204.

In step ST204, the commit flag is cleared. Specifically, the commit flag is changed from "1" to "0". Consequently, data consistency can be maintained in the main area MA. The process then comes to an end.

In a case where the result of the determination in step ST201 shows that the commit flag has not been set, or where the commit flag is "0", the process moves on to step ST205. The commit flag "0" indicates that a failure such as unintended power cutoff has occurred before a commit process is performed after a transaction starts, for example. Therefore, in step ST205, all the valid flags in the table in the temporary area TA are cleared, and the data in the temporary area TA is nullified. Specifically, all the valid flags are changed to "0", and the temporary area TA is returned to the state prior to the transaction process. It should be noted that although not shown in the drawings, the NVRAM controller 102b restarts a transaction process when explicitly receiving a transaction start request command from the memory controller 101. The process then comes to an end.

It should be noted that the commit flag is also changed to "0" in a case where a failure such as unintended power cutoff has occurred while any transaction process is not being performed. A similar process is performed in such a case. A process similar to the above described process is also performed in a case where the power supply is reactivated after a termination process has been properly completed, regardless of whether the power cutoff was unintentional.

It should be noted that in a case where the commit flag is "0", a process of erasing the data in the temporary area TA of the NVRAM 102a may be performed in step S1205. Also, in a case where "0" is set as the valid flag in the first entry in the temporary area TA, it can be determined that no entries have the valid flag "1", and the data in the temporary area TA may not be erased.

According to the above described embodiment of the present disclosure, the data structure in a nonvolatile memory being used as the main storage can be prevented from becoming inconsistent after the power supply is reactivated even in a case where unintended power cutoff has occurred. Thus, there is no need to reconstruct or reload data, and the system can be activated at a high speed.

2. Modification

Although an embodiment of the present disclosure has been specifically described so far, the present disclosure is not limited to the above embodiment, and various changes based on the technical idea of the present disclosure can be made to the embodiment.

Figure 8:
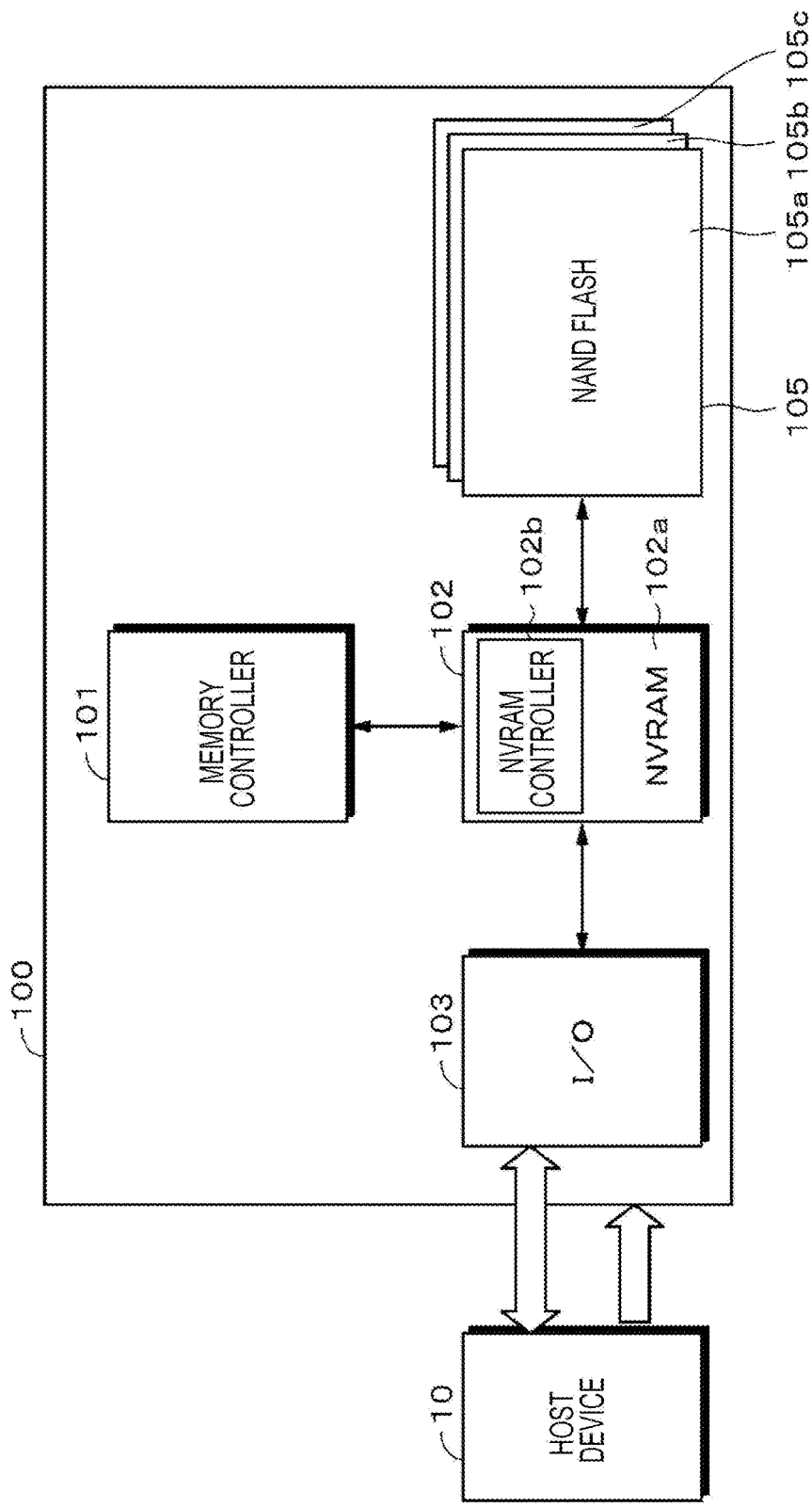
FIG. 8 is a block diagram for explaining an example configuration of a memory device according to a modification.

FIG. 8 is a diagram for explaining a modification of the memory device 100. As shown in FIG. 8, a nonvolatile memory may be used as a buffer RAM while being used as the main storage 102.

In the above described embodiment, the NVRAM controller 102b can access only the main area MA of the NVRAM 102a. However, the present technology is not limited to that.

For example, addresses are assigned to all the areas in the main storage 102 formed with a nonvolatile memory. Using the addresses, the memory controller 101 may logically assign the main area MA, the temporary area TA, and the commit flag area CF to the main storage 102, and use the respective areas for different purposes.

Figure 9:
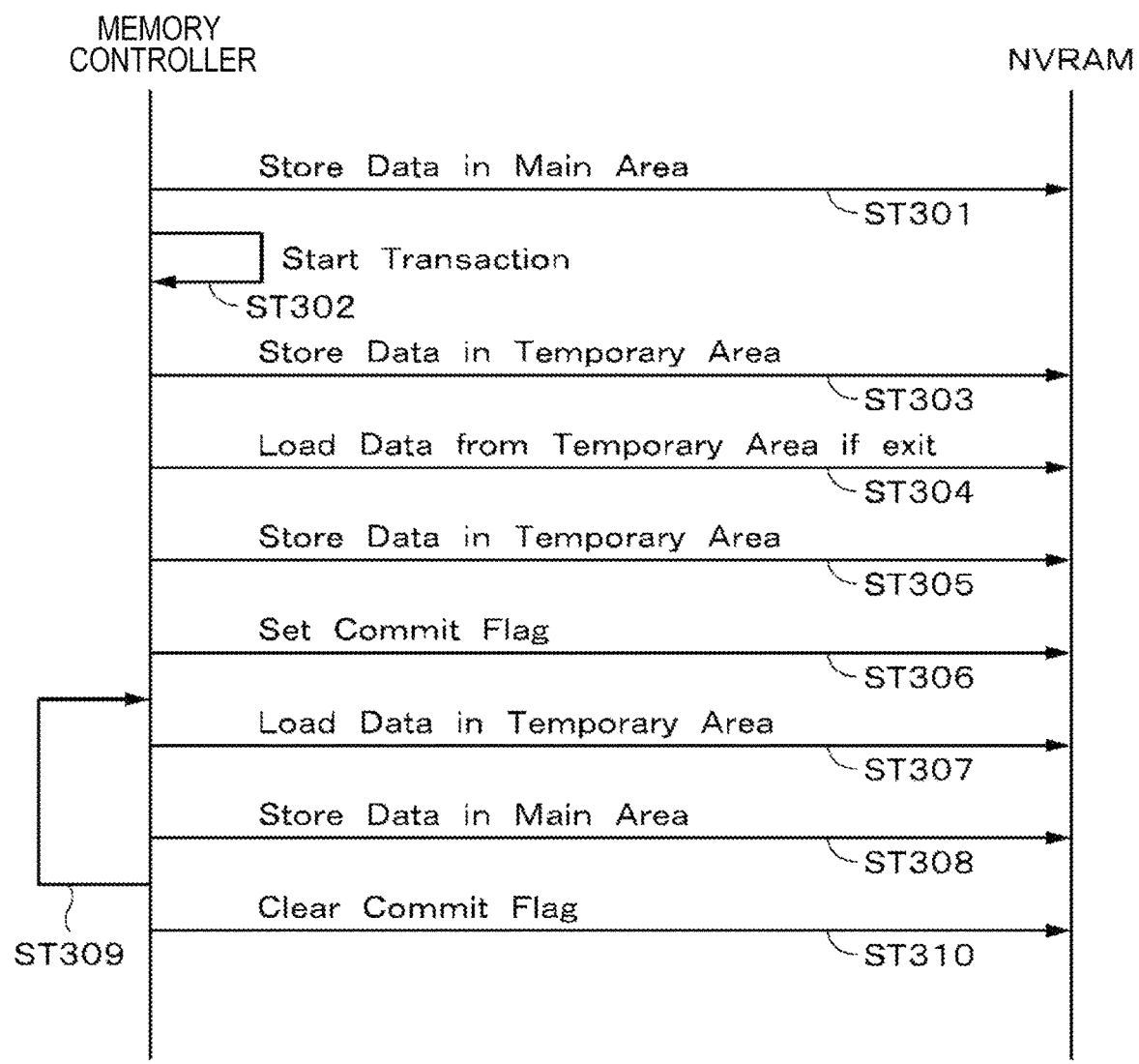
FIG. 9 is a sequence chart for explaining an example of a process sequence according to the modification.

FIG. 9 shows an example of a process sequence in the memory device 100 in a case where the memory controller 101 controls a process of writing into the temporary area TA, a process of rewriting the commit flag, and the like.

In a normal write process, the memory controller 101 writes data into the main area MA of the NVRAM 102a (step ST301).

In a case where a transaction process is to be performed, the memory controller 101 declares a start of a transaction process (step S1302). Having declared a start of a transaction process, the memory controller 101 adds the data to be written, together with address information, to an entry in the table in the temporary area TA, and sets the valid flag (step S1303 and step S305). For example, the valid flag is set to "1".

It should be noted that, to read data in a case where the data to be read is stored in the temporary area TA, the memory controller 101 reads the corresponding data from the temporary area TA (step S1304). It should be noted that if the data to be read is stored in the main area MA, however, the memory controller 101 reads the corresponding data from the main area MA.

When the transaction process that is a series of rewrite processes is completed, the memory controller 101 sets the commit flag (step S1306). In the commit flag area CF of the NVRAM 102a, the commit flag is set to "1", for example.

The memory controller 101 then temporarily reads data from the table in the temporary area TA, and performs a rewrite process on the main area MA by referring to the address information in each entry. For example, the data in the respective entries is copied into the main area MA, with each entry or entries stored in the temporary area TA being a unit. The memory controller 101 clears the valid flags of the entries from which data has been copied. For example, the valid flag of each entry from which data has been copied is changed from "1" to "0" (step ST307 and step ST308).

The procedures in steps ST307 and ST308 are repeated for all the entries in the temporary area TA (step ST309). When the processes for all the entries are completed, the commit flag is cleared (step ST310). For example, the commit flag is changed from "1" to "0". In this manner, the memory controller 101 may perform a process of rewriting each set of data and each flag. That is, the NVRAM controller 102b may be equivalent to an example of the memory control device, and the memory controller 101 may be equivalent to an example of the memory control device.

The logical values mentioned in the above described embodiment and modification are merely examples, and the present technology is not limited to them. Logical values, and the meanings thereof can be set as appropriate. For example, a valid flag "0" may indicate that copying of an entry into the main area MA has not been completed.

In the above described embodiment, a single nonvolatile memory is used as the main storage. However, nonvolatile memories may be used as the main storage. In such a case, temporary areas and main areas may be set in the respective nonvolatile memories.

The present disclosure can be embodied not only by a device but also by a method, a program a recording medium storing a program, a system, and the like. A program can be provided to a user via a network or via a portable memory such as an optical disk or a semiconductor memory.

It should be noted that the configurations and processes according to the embodiment and the modification can be combined as appropriate, without causing technical inconsistency. The process sequences in the examples of the processes can be changed as appropriate, without causing technical inconsistency.

The present disclosure can also be applied to a so-called cloud system in which the examples of processes are processed by devices in a decentralized manner. The present disclosure can be embodied as a system that processes the examples of processes according to the embodiment and the like, and as a device that performs at least one of the examples of processes.

The present disclosure may also be embodied in the configurations described below.

(1)

A memory control device including a control unit that performs data write/read control on a nonvolatile memory having at least a first area and a second area, wherein:

when writing sets of data into the first area, the control unit temporarily writes the sets of data into the second area; and, when copying the respective sets of data written into the second area into the first area, the control unit sets a flag indicating whether the copying of the sets of data into the first area has been completed.

(2)

The memory control device of (1), wherein, when the copying is completed, the control unit clears the flag.

(3)

The memory control device of (1) or (2), wherein the control unit associates the data with the flag indicating whether the copying into the first area has been completed and address information about the first area as a copy destination, and writes the data associated with the flag and the address information into the second area.

(4)

The memory control device of (3), wherein, when the copying of the data into the first area is completed, the control unit clears the flag associated with the data in the second area.

(5)

The memory control device of any of (1) through (4), wherein each of the plurality of sets of data is data corresponding to one of a plurality of write processes in a process to be made valid by the write processes.

(6)

The memory control device of any of (1) through (5), wherein the nonvolatile memory is a memory that is connected to the control unit and is used as a main storage.

(7)

The memory control device of any of (1) through (6), wherein the flag is stored in a third area of the nonvolatile memory.

(8)

A memory control device including a control unit that performs data write/read control on a nonvolatile memory having at least a first area and a second area, wherein, when a first flag has been set at a time of activation of a power supply, the control unit copies data having a second flag set therefor into the first area, the data being of data stored in the second area.

(9)

The memory control device of (8), wherein the first flag is information indicating whether all the data having the second flag set therefor has been copied from the second area into the first area.

(10)

The memory control device of (8) or (9), wherein:

the second flag and address information about the first area as a copy destination are associated with the data and are stored in the second area; and the control unit copies the data from the second area into the first area in accordance with the address information.

(11)

The memory control device of any of (8) through (10), wherein, when the first flag has not been set at the time of activation of the power supply, the control unit clears the second flag.

(12)

A memory device including:

a nonvolatile memory having at least a first area and a second area; and a control unit that performs data write/read control on the nonvolatile memory, wherein:

when writing sets of data into the first area, the control unit temporarily writes the sets of data into the second area; and, when copying the respective sets of data written into the second area into the first area, the control unit sets a flag indicating whether the copying of the sets of data into the first area has been completed.

(13)

A memory device including:

a nonvolatile memory having at least a first area and a second area; and a control unit that performs data write/read control on the nonvolatile memory, wherein, when a first flag has been set at a time of activation of a power supply, the control unit copies data having a second flag set therefor into the first area, the data being of data stored in the second area.

(14)

A memory control method implemented by a control unit that performs data write/read control on a nonvolatile memory having at least a first area and a second area, the memory control method including:

temporarily writing sets of data into the second area, when writing the sets of data into the first area; and, setting a flag indicating whether copying of the sets of data into the first area has been completed, when copying the respective sets of data written into the second area into the first area.

(15)

A memory control method implemented by a control unit that performs data write/read control on a nonvolatile memory having at least a first area and a second area, the memory control method including, when a first flag has been set at a time of activation of a power supply, copying data having a second flag set therefor into the first area, the data being of data stored in the second area.

REFERENCE SIGNS LIST

1 Information processing system
100 Memory device
101 Memory controller
102 Main storage
102a NVRAM
102b NVRAM controller

The invention claimed is:

1. A memory control device comprising
a control unit configured to perform data write/read control on a nonvolatile memory having at least a first area and a second area,
wherein:
when writing a plurality of sets of data into the first area, the control unit temporarily writes the sets of data into the second area; and,
when copying the respective sets of data written into the second area into the first area, the control unit sets a flag indicating whether the copying of the sets of data into the first area has been completed.

2. The memory control device according to claim 1, wherein, when the copying is completed, the control unit clears the flag.

3. The memory control device according to claim 1, wherein the control unit associates the data with the flag indicating whether the copying into the first area has been completed and address information about the first area as a copy destination, and writes the data associated with the flag and the address information into the second area.

4. The memory control device according to claim 3, wherein, when the copying of the data into the first area is completed, the control unit clears the flag associated with the data in the second area.

5. The memory control device according to claim 1, wherein each of the plurality of sets of data is data corresponding to one of a plurality of write processes in a process to be made valid by the write processes.

6. The memory control device according to claim 1, wherein the nonvolatile memory is a memory to be used as a main storage, the memory being connected to the control unit.

7. The memory control device according to claim 1, wherein the flag is stored in a third area of the nonvolatile memory.

* * * * *